(12) United States Patent
Johanson

(10) Patent No.: US 6,349,962 B1
(45) Date of Patent: Feb. 26, 2002

(54) COLLAPSIBLE DOMESTIC CART

(75) Inventor: Stanley A. Johanson, deceased, late of Chipita Park, CO (US), by John S. Johanson, legal representative

(73) Assignee: Gaviota Cart LLC, Chipita Park, CO (US)

(*) Notice: Subject to any disclaimer, the term of this patent is extended or adjusted under 35 U.S.C. 154(b) by 0 days.

(21) Appl. No.: 09/569,335

(22) Filed: May 11, 2000

(51) Int. Cl.[7] .................................................. B62B 7/06
(52) U.S. Cl. ........................ 280/651; 280/42; 280/79.3
(58) Field of Search ................................ 280/639, 641, 280/35, 638, 642, 42, 47.34, 647; 108/111, 170, 177, 118, 69, 101, 80; 211/200; 248/98, 129, 164, 432

(56) References Cited

U.S. PATENT DOCUMENTS

| | | | |
|---|---|---|---|
| 1,304,847 A | * 5/1919 | Blais et al. | 108/163 |
| 1,408,604 A | * 3/1922 | Kawa | 108/177 |
| 1,858,857 A | * 5/1932 | Huntley | 108/69 |
| 1,862,911 A | * 6/1932 | Snyder | 108/167 |
| 2,052,803 A | * 9/1936 | Schmoller | 280/641 |
| 2,596,986 A | * 5/1952 | Curtis | 280/641 |
| 2,865,646 A | * 12/1958 | Kronhaus | 280/641 |
| 3,074,734 A | 1/1963 | Munson et al. | 280/41 |
| 3,202,438 A | * 8/1965 | Panknin et al. | 280/42 |
| 3,436,092 A | 4/1969 | Werner | 280/36 |
| 4,339,141 A | * 7/1982 | Thiboutot | 280/652 |
| 4,446,796 A | * 5/1984 | Wilson et al. | 108/69 |
| 4,705,247 A | * 11/1987 | Delmerico | 248/98 |
| 4,740,010 A | 4/1988 | Moskovitz | 280/641 |
| 5,048,857 A | * 9/1991 | Stevens | 280/651 |
| D367,379 S | * 2/1996 | Nicholson et al. | D6/429 |
| 5,730,452 A | 3/1998 | Fields | 280/47.35 |
| 5,806,864 A | * 9/1998 | Zielinski et al. | 280/42 |
| 5,865,127 A | * 2/1999 | Carter | 108/115 |
| 5,915,723 A | * 6/1999 | Austin | 280/651 |

* cited by examiner

Primary Examiner—Brian L. Johnson
Assistant Examiner—Bridget Avery
(74) Attorney, Agent, or Firm—Dorsey & Whitney LLP

(57) ABSTRACT

A collapsible domestic cart has at least a pair of vertical support members with one or more trays pivotally connected therewith. A frame support connected with the other end of the trays is connected to the vertical supports by an articulating lazy-tong mechanism so that the cart when moved from a collapsed position, with the trays in a vertical position, to an open position, with the trays in a horizontal position, does not increase substantially in height.

18 Claims, 8 Drawing Sheets

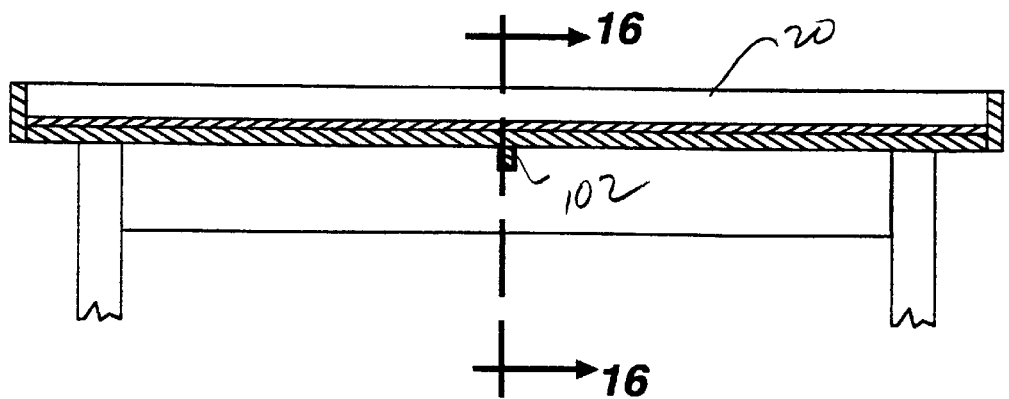
Fig. 15
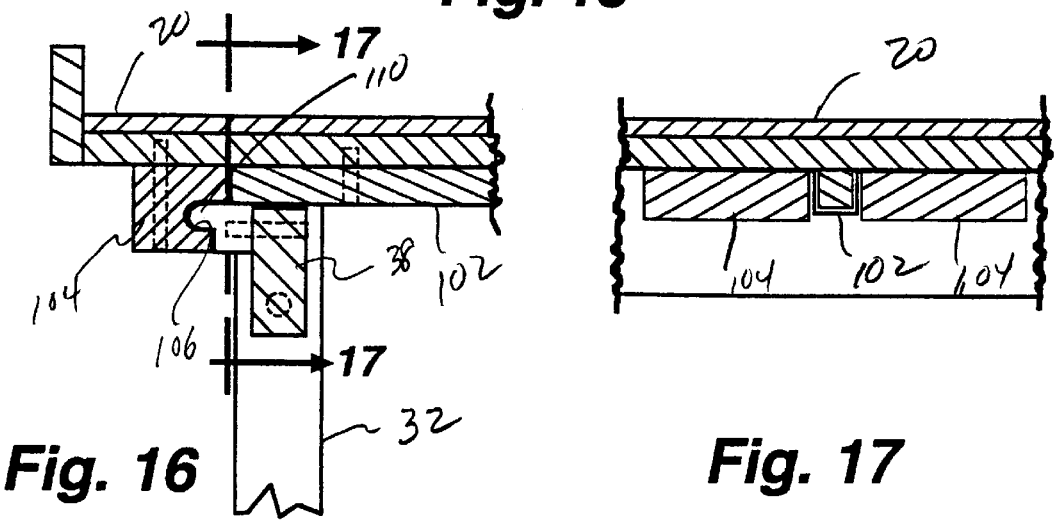
Fig. 16  Fig. 17
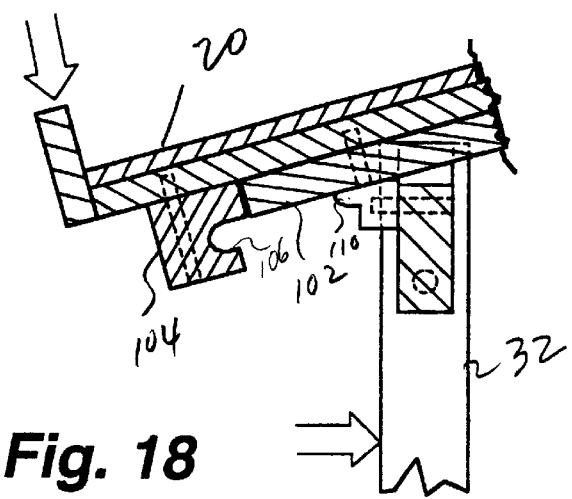
Fig. 18

COLLAPSIBLE DOMESTIC CART

BACKGROUND OF THE INVENTION

This invention relates to a portable collapsible domestic cart and more particularly to a collapsible cart which may be utilized for food service. It is often desired in the home, and in many commercial establishments, to have a food service cart which can readily support plates or trays of food and which can be conveniently rolled from one location to another to facilitate the serving of food. It is also desirable that such food service carts, particularly when used in the home, be collapsible to a small size for easy and convenient storage when the cart is not in use.

Collapsible carts have been provided heretofore, and in particular collapsible carts intended for food service. Illustrative of some of these prior collapsible carts are those disclosed is U.S. Pat. No. 4,740,010 to Moskovitz, U.S. Pat. No. 5,730,452 to Fields, U.S. Pat. No. 3,436,092 to Werner and U.S. Pat. No. 3,074,734 to Munsen et al. Each of these patents disclose and describe collapsible and foldable carts applicable for food service.

U.S. Pat. No. 4,740,010 to Moskovitz discloses a foldable cart wherein a plurality of vertically spaced tray members are pivoted at their outer ends to end frames and pivotally mounted at their inner ends to a lift bar member. A mechanical stop is provided to secure the cart in both the fully opened and fully closed position. The lift bar mechanism employed results in increasing the height of the cart when it is in its folded position so that an increased height storage facility is necessary. U.S. Pat. No. 3,436,092 to Werner discloses a collapsible cart where a pair of upper and lower tray members are pivotally mounted to end support members and move from a vertical position to a horizontal position when the cart goes from its collapsed position to its open position. U.S. Pat. No. 5,730,452 to Fields discloses a collapsible cart where a plurality of tray members are pivotally mounted along their mid-point to side frame members which are hinged so as to move from an opened position to a closed position in an accordion fashion. U.S. Pat. No. 3,074,734 to Munsen et al.discloses a collapsible serving cart where the tray support members are pivotally mounted toward the rear to a frame member and move from a collapsed position where the tray members are vertically disposed to an open position with the tray members are horizontally oriented.

SUMMARY OF THE INVENTION

The present invention provides a collapsible food domestic cart that is movable between an expanded open and a collapsed storage position. Preferably, the collapsible cart comprises a central structure that includes a pair of upright centrally located support members at each side of the cart. The support members may also include upper and lower relatively short fixed horizontal panels. Each central support member serves as an anchor for one end of a lazy-tong type mechanism on either side of the support members. Upper and lower support trays are pivotally connected to the upper and lower horizontal panels so that the trays can pivot from a collapsed position to an open service condition. The collapsible trays are also supported by moveable legs at each of the four corners of the cart which form an outer support frame for the trays. The bottom of each leg is equipped with a wheel so that the cart, either in its open or closed state, can be readily wheeled from place to place. The lazy-tong collapsing mechanism provides that the cart collapses in essentially a parallel manner so that there is no increase in the height of the cart between its open and collapsed state.

To accommodate the collapsible movement of the cart, each of the central support members are equipped with a compression spring in its lower end. The springs are in the fully compressed position when the cart is expanded into its operable mode, and in a neutral position in the collapsed position. The compression springs assist in helping movement when the cart is moved from the open to its collapsed storage position. This facilitates closure of the collapsible food domestic cart.

The underside of each collapsible tray segment also carries a block member having a notch therein which receives the end of a guide strip rib. When the cart is opened, the guide strip slides along a lateral support member until the end of the guide strip engages a groove in the block member mounted to the underside of each tray.

It is an object of the present invention to provide a collapsible cart assembly suitable for food service which expands from a collapsed condition where one or more tray members are in a substantially vertical position to an open service condition where there is no substantial increase in the vertical height of the assembly between the open service and collapsed condition.

It is a further object of the present invention to provide a collapsible domestic cart wherein one or more tray members are pivotally supported on a support member at one end and. supported by a frame support at the other end and wherein the frame support is connected to the support member by an articulating mechanism which moves the frame support relative to the support member without a substantial overall increase in the vertical height of the domestic cart.

A further object of the present invention is to provide a collapsible domestic cart which can be reliably and easily opened and collapsed without undue effort.

BRIEF DESCRIPTION OF THE DRAWINGS

FIG. 15 is a sectional view taken along line 15—15 of FIG. 7;

FIG. 16 is a sectional view taken along line 16—16 of FIG. 15;

FIG. 17 is a sectional view taken along line 17—17 of FIG. 16; and

FIG. 18 is a view similar to FIG. 16 showing the collapsible cart is in a intermediate position.

DESCRIPTION OF THE PREFERRED EMBODIMENT

Figure 1:
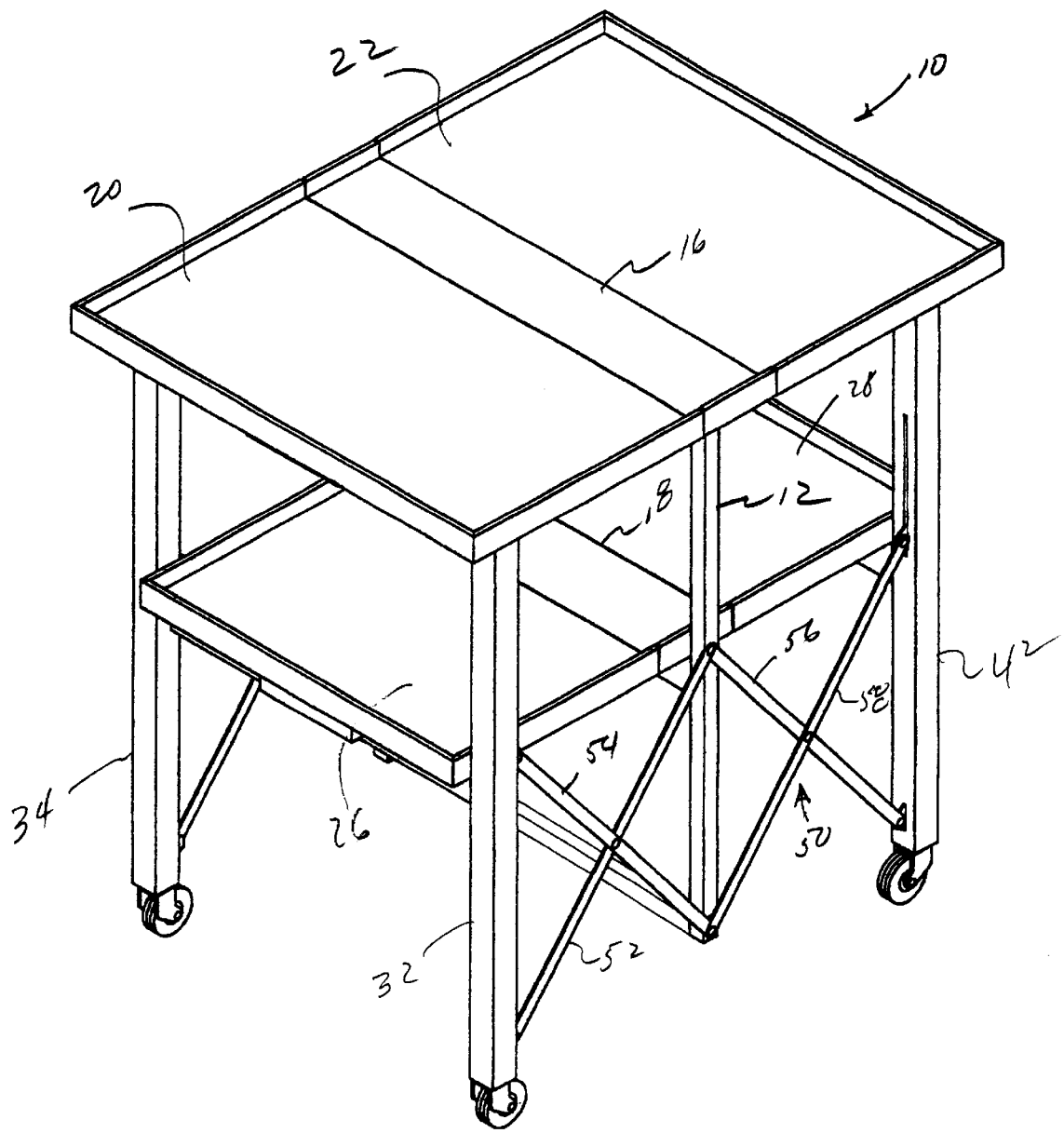
FIG. 1 is a perspective view showing the collapsible cart in its open and operable service position.

Referring now to the drawings and initially to FIGS. 1 through 7, collapsible cart 10 of the present invention includes a pair of opposed centrally disposed vertical support members 12 and 14 to which are secured an upper horizontal panel 16 and an intermediate horizontal panel 18. A pair of upper tray members 20 and 22 are hinged at each side of upper horizontal panel 20, for example by a piano hinge 24, and a pair of intermediate tray members 26 and 28 are similarly hinged, by piano hinge 30, to opposite sides of intermediate horizontal panel 18. A preferred embodiment is described herein as having four tray members to provide upper and lower support surfaces. It is to be understood that the invention may be used with one tray or with a pair of trays either on each side of a central support or as upper and lower trays on the same side of a support.

Vertical supports 32 and 34, interconnected by upper cross brace 36 and intermediate cross brace 38, are provided to support and articulate upper tray 20 and intermediate tray 26. In like manner, vertical supports 42 and 44, interconnected by upper cross brace 46 and intermediate cross brace 48, are provided to articulate upper tray 22 and intermediate tray 28 on the other side of horizontal panels 16 and 18. The vertical supports and cross braces form a frame support for the outer ends of each tray. All of the vertical supports 32, 34, 42 and 44 are also provided with wheels 40 to facilitate transportation of the cart from place to place either while closed or open.

Figure 6:
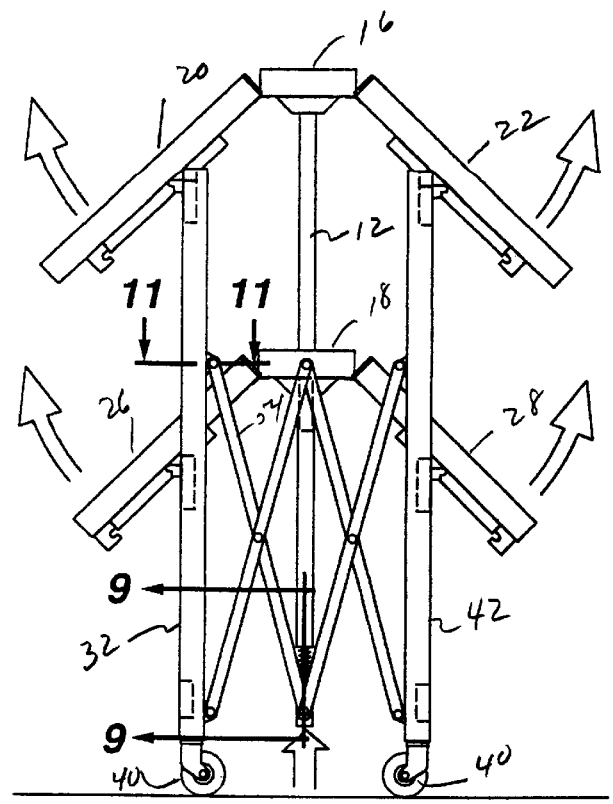
FIG. 6 is a side elevational view showing the cart in an intermediate position.
Figure 7:
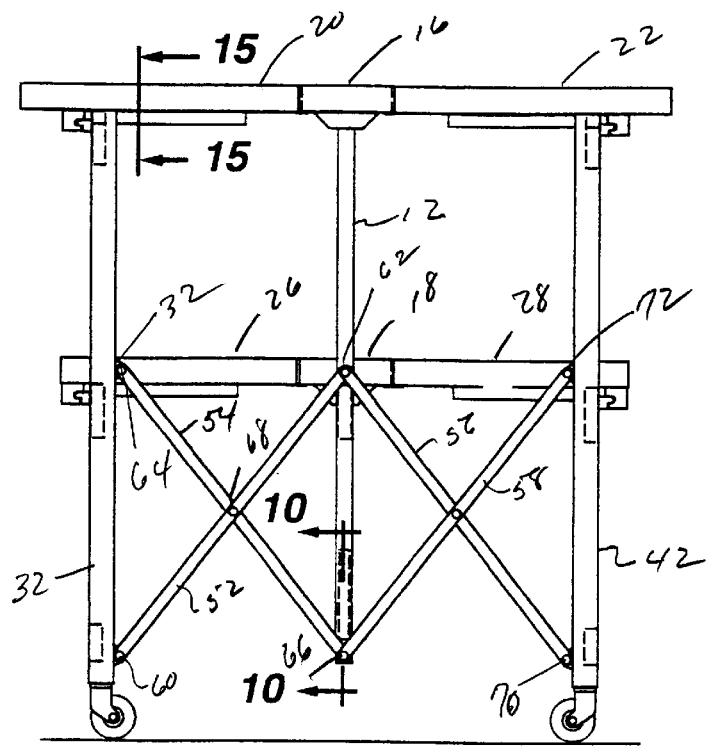
FIG. 7 is a side elevational view showing the cart in its open position.

A lazy-tong mechanism 50 interconnects vertical supports 32 and 42 with central vertical support member 12 and, similarly, a lazy-tong mechanism 50 interconnects vertical supports 34 and 42 with central vertical support member 14. Each lazy-tong assembly includes four separate struts 52, 54, 56 and 58, respectively. As best shown in FIGS. 6 and 7 each lazy-tong strut is pivotally connected to the vertical support members and to each other. For example, strut 52 is pivotally connected to vertical support 32, as at 60, and to vertical support number 12 at 62. Similarly strut 54 is pivotally connected at 64 to vertical support 32 and pivotally connected at 66 to vertical support 12. Struts 52 and 54 are also pivotally connected at their centers, as at 68. Struts 56 and 58 of lazy-tong assembly 50 are similarly pivotally connected between central vertical support member 12 and vertical support member 42. Strut 58 is pivotally connected to central support member 12 at 66 along with strut 54 and strut 56 is pivotally connected to central support member 12 at 62 along with strut 52. Strut 56 is pivotally connected to vertical support member 42 at 70 and strut 58 is pivotally connected to vertical support 42 at 72. Lazy-tong assembly 50 on the other side is similarly pivotally connected between vertical supports 34 and 44 and central support member 14. While a lazy-tong mechanism is the preferred mechanism to articulate the outer vertical supports toward and away from the central vertical supports, it is appreciated that other mechanisms, which can articulate the outer supports toward and away from the central supports may also be utilized. The preferred articulating mechanism is one which essentially moves the outer vertical supports toward and away from the central supports without resulting in a substantial increase in the overall vertical height of the assembly.

Figure 5:
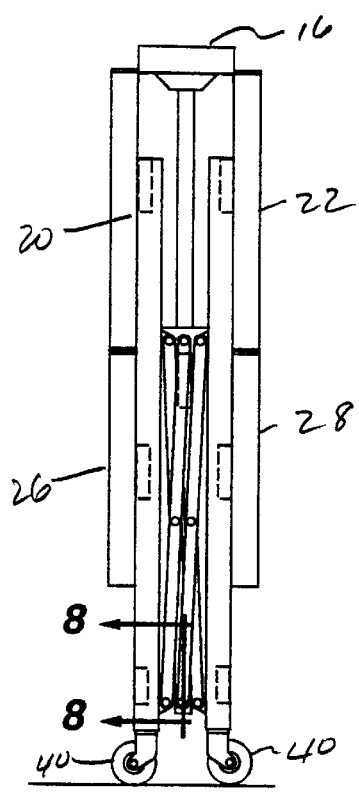
FIG. 5 is a side elevational view showing the cart in its collapsed position.

With the structural members described thus far it is evident, as shown in FIGS. 5 through 7, that the collapsible domestic cart assembly can move from the closed position shown in FIG. 5 through the intermediate position shown in FIG. 6, where the trays 20, 22, 26 and 28 move from the vertical position through the intermediate position in the direction of the arrows, to a fully opened position as shown in FIG. 7. The lazy-tong assembly 50 expands from the closed position shown in FIG. 5 through the intermediate position shown in FIG. 6 to the fully extended position shown in FIG. 7 resulting in each of the trays pivoting from a substantially vertical position to a horizontal position.

The present invention also provides for a locking action to ensure that the collapsible domestic cart assembly when it is placed in the fully opened position, as shown in FIG. 7, is locked into that position to avoid undesirable closing. The invention also uses a spring member to assist in movements from the open position to the closed position. Accordingly, as will be described hereinafter, provision is made to lock the collapsible domestic cart assembly from its open position.

Figures 8, 9:
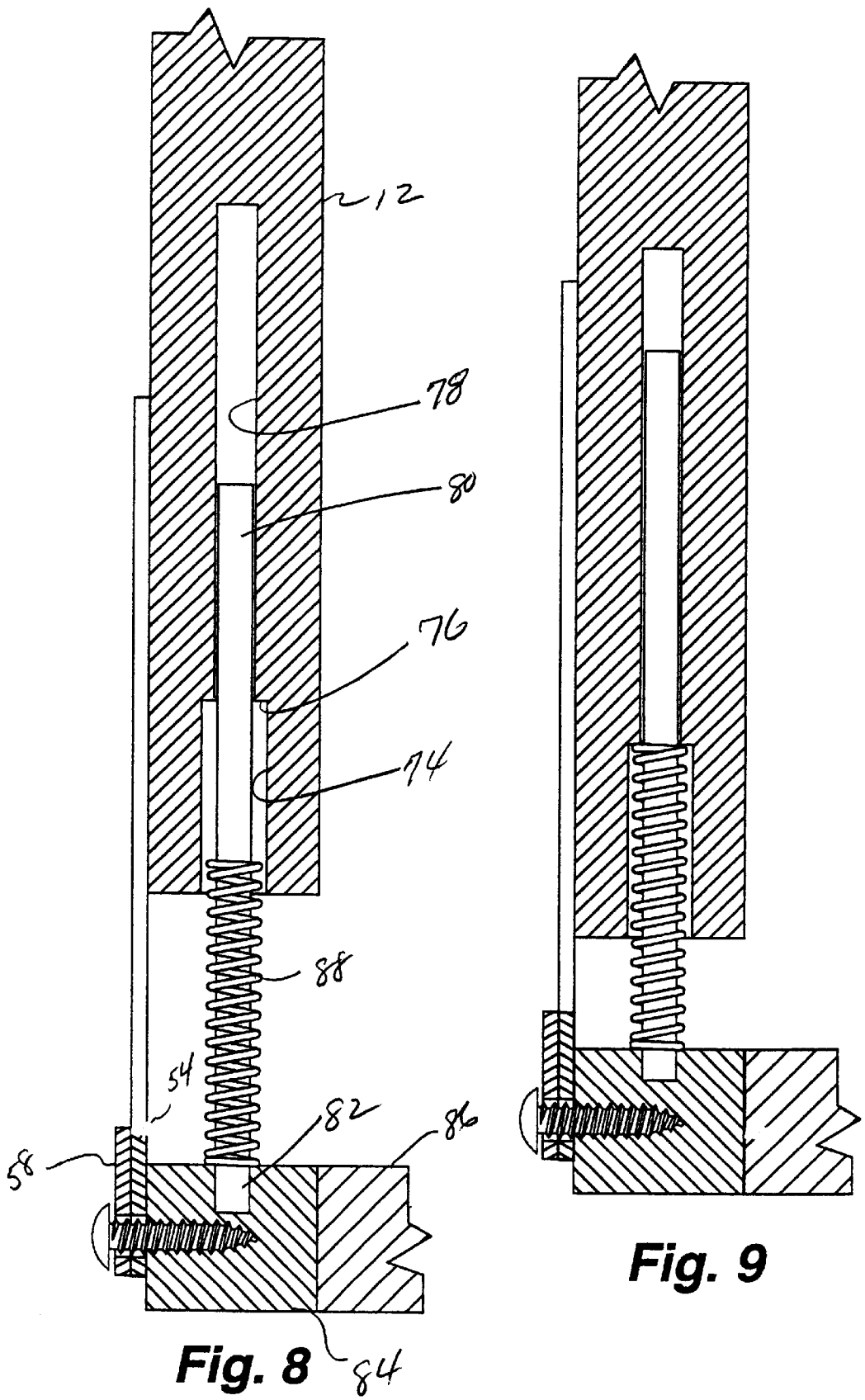
FIG. 8 is a sectional view taken along line 8—8 of FIG. 5.
FIG. 9 is a sectional view taken along line 9—9 of FIG. 6.
Figure 10:
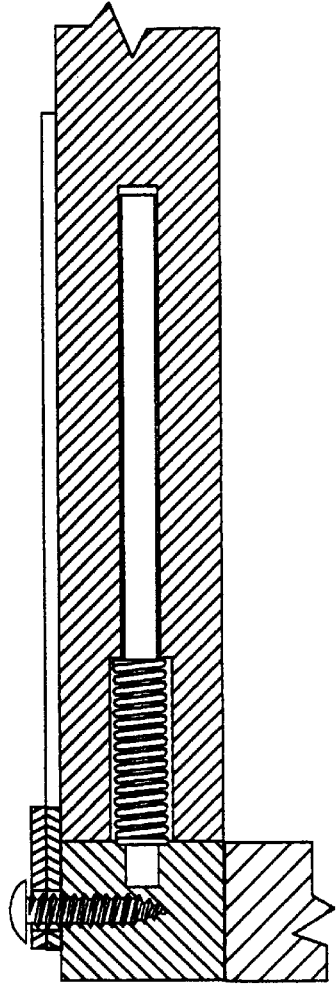
FIG. 10 is a sectional view taken along line 10—10 of FIG. 7.
Figure 10A:
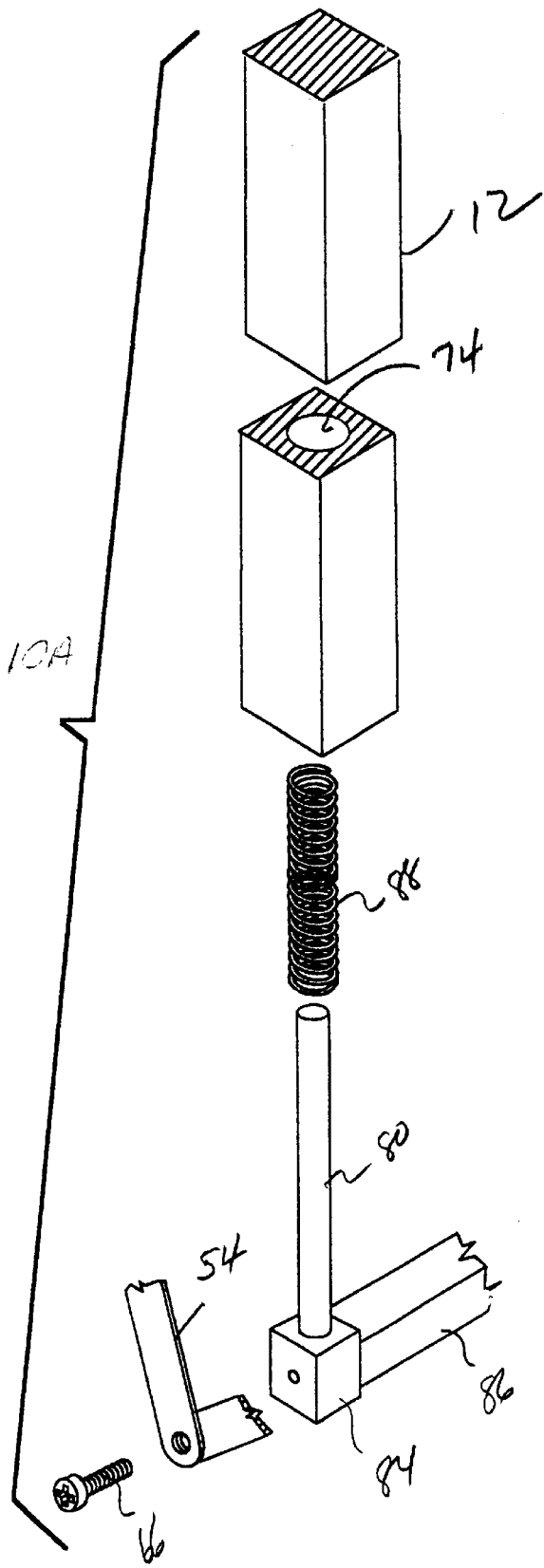
FIG. 10a is an exploded perspective view of the parts illustrated in FIG. 10.
Figure 11:
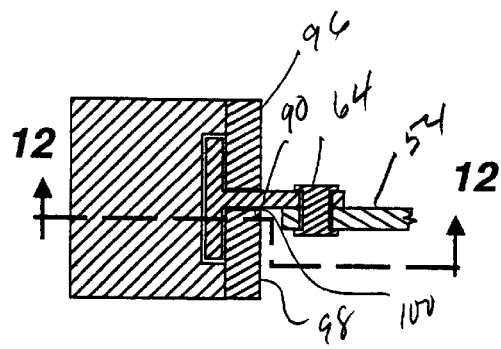
FIG. 11 is a sectional view taken along line 11—11 of FIG. 6.
Figure 14:
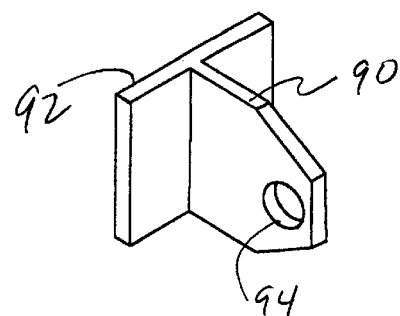
FIG. 14 is a perspective view of the bracket shown in FIGS. 11, 12 and 13.

Reference is now made to FIGS. 8, 9,10 and 10a where a spring assembly is shown which assists in urging the collapsible domestic cart assembly from its open service position to the collapsed position. The spring assembly in FIGS. 8 to 10a is mounted at the lower end of vertical support member 12 and a similar and like assembly is mounted in the lower end of vertical support member 14. As shown in FIG. 8, the lower end of vertical member 12 includes a through bore 74 part way into vertical support member 12 to a shoulder 76 and continuing into support member 12 as a through bore 78 of a less diameter than the initial through bore 74. A rod 80 is reciprocally received within through bore 74 and 78. One end 82 of rod 80 is mounted in a mounting block 84 which is interconnected by a cross brace 86 with a similar assembly associated with the opposite central vertical support member 14. A compression spring 88 is disposed about rod 82 and, as illustrated in FIG. 8, when the service cart assembly is in its collapsed position, as shown in FIG. 5, there is no tension on compression spring 88. As the collapsible tray assembly is moved to its open position, as shown in FIG. 6, the lazy-tong assembly begins to spread apart and block 82 moves upwardly, as indicated by the arrow in FIG. 6, so that the compression spring seats against shoulder 76 in through bore 74 and tension is exerted on the spring. When the collapsible domestic cart assembly has moved to its completely open service position, as shown in FIG. 7, block 82 has moved upwardly to contact the lower surface of support member 12 and compression spring 88 is now under maximum tension between shoulder 74 and block 82. The tension on the compression spring is useful when the tray assembly is to be collapsed from its open position, as shown in FIG. 7, to the closed position, as shown in FIG. 5, as the spring tension assists in downward movement of mounting block 84 which provides a compression spring force to assist in urging the lazy-tong assembly 50 to a move toward the closed collapsed position.

Reference is now made to FIGS. 11 through 14 for details of the mount of the struts 52, 54, 56 and 58 at their exterior ends to the vertical support members 32 and 42, respectively.

Each of the strut ends are mounted in like manner so that description of one mount will suffice to describe all of the mountings.

Figure 12:
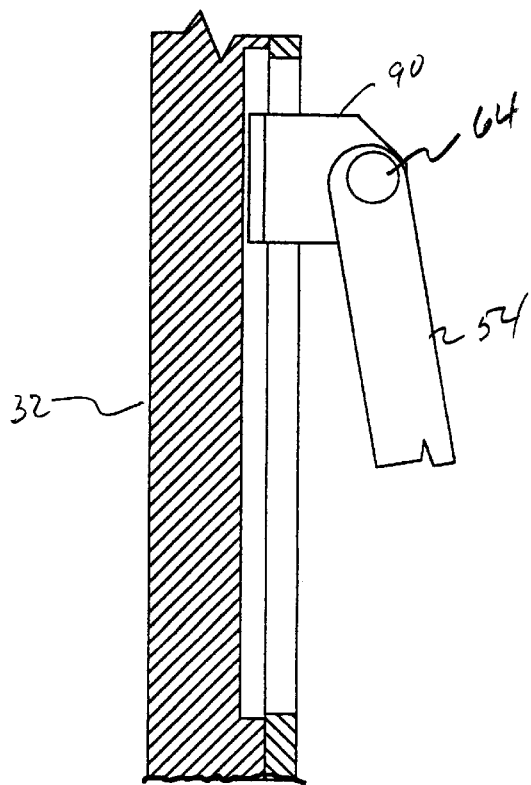
FIG. 12 is a sectional view taken along line 12—12 of FIG. 11.
Figure 13:
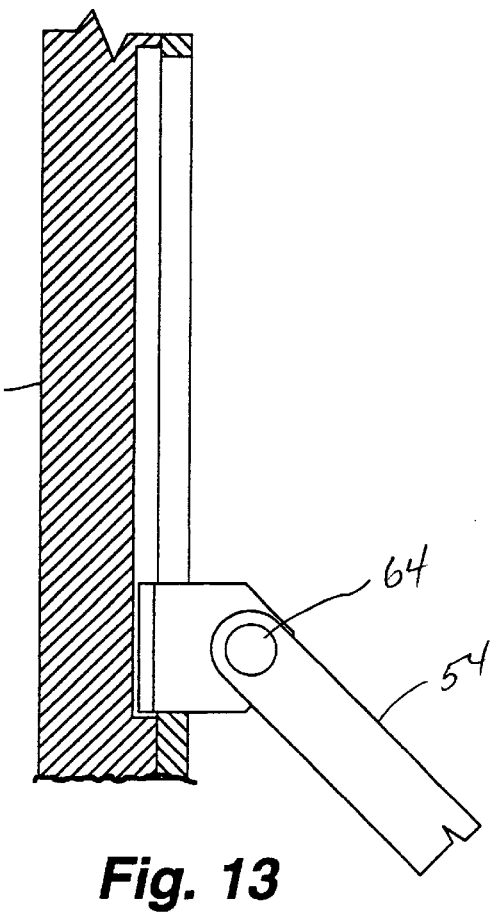
FIG. 13 is a view similar to FIG. 12 showing the same mechanism illustrated in FIG. 12 when the cart is in a fully open position.

As seen in FIGS. 11 through 14, each strut end 54 is pivotally mounted, as at 64, to an extending leg 90 of a T-shaped bracket 92. Leg 90 has a through bore 94 to receive the pivoting mount 64 of the end of strut 54. The T-shaped bracket 92 is confined for vertical sliding movement along vertical support 32 by plate members 96 and 98 secured to the interior surface of vertical support 32 so as to provide an opening 100 to accommodate the extending leg 90 of bracket 92. Thus as shown in FIGS. 12 and 13, as the lazy-tong mechanism 50 causes the collapsible domestic cart assembly to move from the closed position to the open position, the bracket 92 will slide vertically downwardly. Upon closing of the collapsible cart assembly, the bracket 92 will slide vertically upwardly.

Each upper tray member 20 and 22 and each intermediate tray member 26 and 28 is slidably disposed with respect to its associated cross brace member 36, 38, 46 and 48. Accordingly, the underside of each tray is provided with structure to facilitate sliding along the respective cross base member and also to ensure a lock with respect to the cross base member when the collapsible cart assembly is in its fully opened position, as shown in FIG. 7. Each of the assemblies for each tray are similar so that description of one will suffice for a description of the others.

Figure 2:
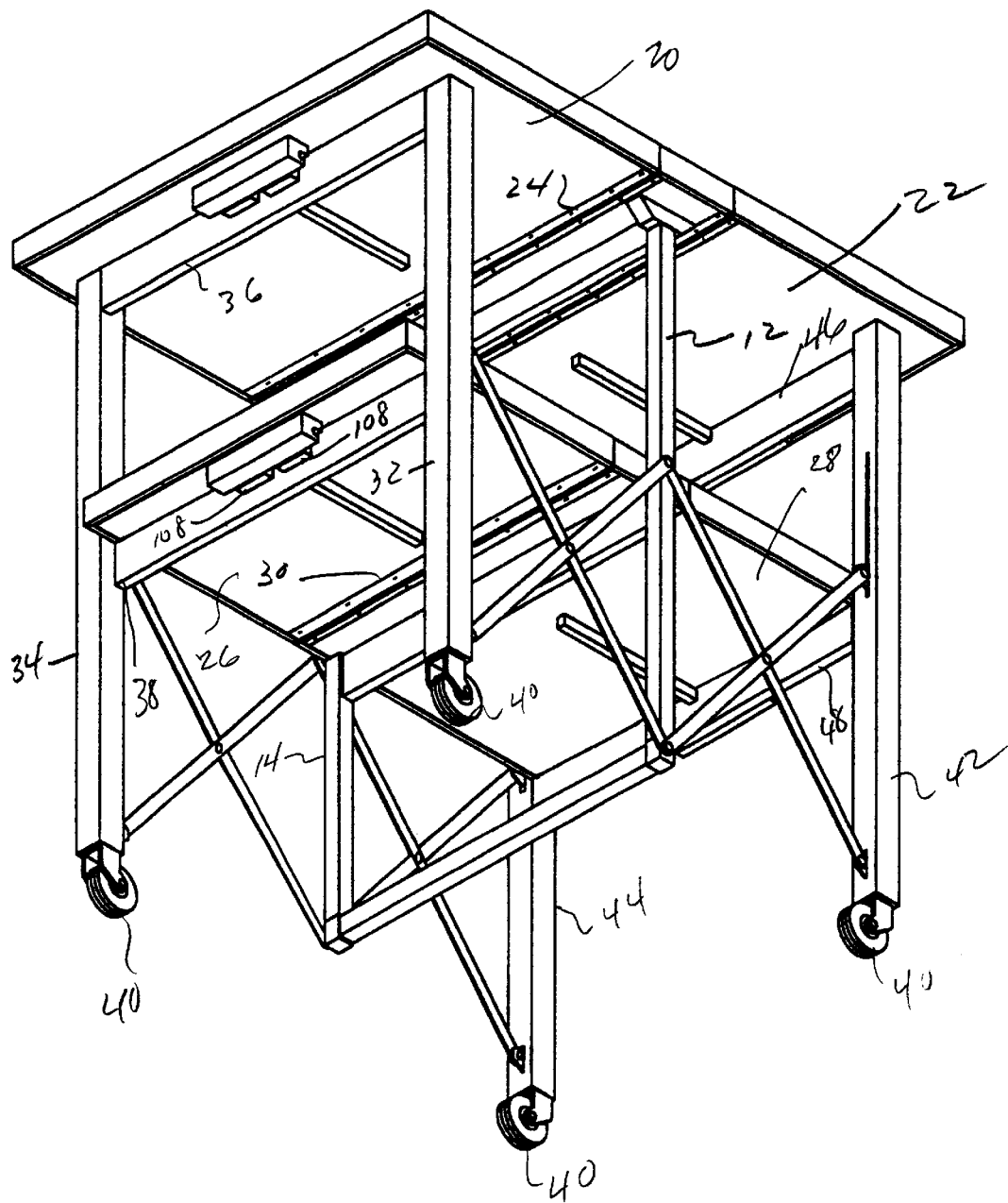
FIG. 2 is a bottom perspective view showing the cart in its open service position.
Figure 4:
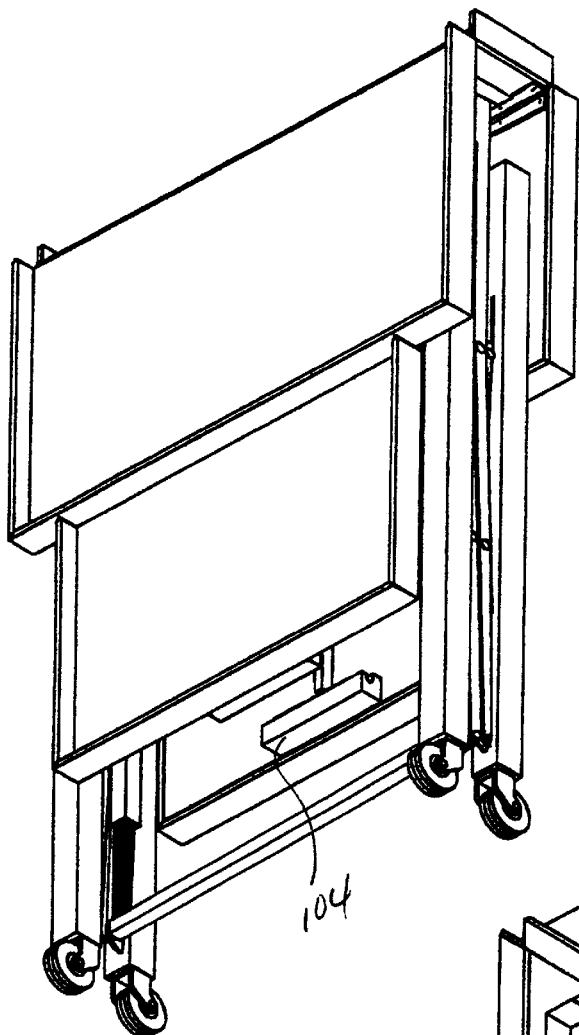
FIG. 4 is a perspective view, looking up, showing the cart in its collapsed position.
Figure 3:
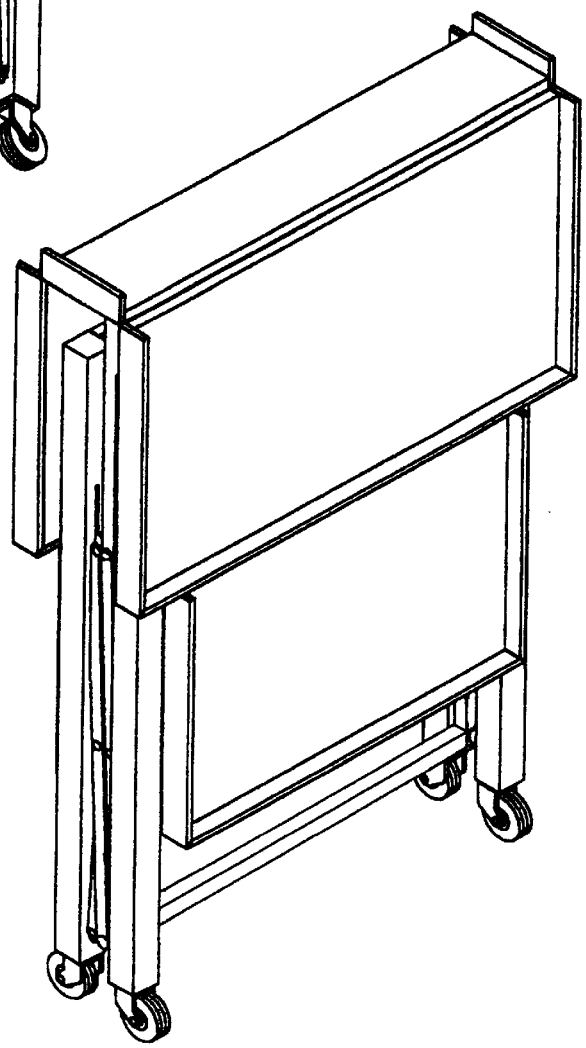
FIG. 3 is a perspective view showing the cart in the collapsed position.

Referring now to FIGS. 15 through 18, as well as FIG. 2, it is seen that the underside of each tray includes a longitudinal runner adapted to slidably ride along the upper edge of vertical support number 32. A stop block 104 is secured to the underside of each tray near its outer edge adjacent to the end of runner 102. Stop block 104 includes a rounded undercut portion 106 which faces inwardly. Each cross brace, in the area immediately below a respective tray, is provided with an engagement block 108 having a nodular extension 110 corresponding to the shape of the rounded undercut 106 of stop block 104 so that when the collapsible tray assembly is in its fully extended position, as seen in FIG. 16, the nodular extension 110 is received within the rounded undercut 106 of stop block 104 to securely lock the tray assembly in the open position.

It is thus seen that there has been provided a collapsible tray assembly wherein one or more tray members in the collapsed position are disposed in a vertical array. A lazy-tong articulating mechanism interconnect central vertical support members which pivotally support the trays at one end to a support assembly connected to the other end of the trays. When the lazy-tong mechanism expands the outer vertical support members move away from the central support members to pivot the tray or trays from a vertical position to a horizontal position. When the trays reach the full horizontal position they are lockingly engaged to preclude inadvertent collapse of the assembly. A compression spring member is provided to assist in retracting the lazy-tong mechanism when it is desired to collapse the tray assembly from the open position to the closed position.

What is claimed is:

1. A collapsible domestic cart assembly comprising:
   at least a pair of vertically disposed support members
   at least one tray member, said tray member begin pivotally mounted at one end to said vertical support members so as to be pivotable fron afirst substantially vertical position when said assembly is in a collapsed condition to a second substantially horizontal position when said assembly is in open service condition,
   a vertically disposed frame member associated with said tray to support said tray to support said tray at the end oppsited said one end when said assembly is in its open service condition,and
   an articulating mechanism connected between said vertically disposed support members and said frame support to move said frame member laterally outwardly from a first position adjacent said support members to a second position space from said support members without any substantial change in the vertical height of said asembly as said frame member move from said first position to said second position.

2. The collapsible domestic cart assembly according to claim 1 wherein there are a plurality of tray members pivotally mounted to said vertical support members.

3. The collapsible domestic cart assembly according to claim 1 wherein said articulating mechanism comprises a lazy-tong mechanism.

4. The collapsible domestic cart assembly according to claim 1 wherein a horizontal member is disposed between said vertical support members and said at least one tray member is pivotally mounted to said horizontal member.

5. The collapsible domestic cart assembly according to claim 1 wherein said support members are provided at their lowermost ends with a vertically movable block member, and
   wherein said articulating mechanism has one end thereof pivotally secured to said block member whereby when said assembly moves from said first position to said second position said block member moves vertically upwardly.

6. The collapsible domestic cart assembly according to claim 1 wherein said tray includes a slide member to slidably move along said frame member when said frame member moves from said first position to said second position.

7. The collapsible domestic cart assembly according to claim 2 wherein said plurality of tray members are disposed on each side of said vertical support members.

8. The collapsible domestic cart assembly according to claim 5 including a spring member interposed between said block member and said vertical support member to urge said assembly to move from said second position to said first position.

9. The collapsible domestic card assembly according to claim 6 wherein said frame member includes a stop block, and
   wherein said slide member is lockingly engaged within said stop block when said frame member is moved into said second position thereby to lock said assembly in an open service position.

10. A collapsible domestic cart assembly comprising:
   a pair of vertically disposed support members,
   a plurality of tray members pivotally mounted to one end thereof to said support members,
   a vertically disposed frame support for said tray membrs at the other end thereof, and
   an articulating mechanism connected between said vertically disposed support members and said frame support to move said frame support laterally outwardlynfrom a first position adjacent said suport member where said tray members are in a substantially vertical orientation to a second position spacce from said support members where said tray members are in a substantially planar horizontal orientation,and
   wherein said articulating mechanism moves said frame support from said first position to said second position without any substantial change in the vertical height of said cart assembly.

11. The collapsible cart assembly according to claim 10 wherein said articulating mechanism is a lazy-tong mechanism.

12. The collapsible cart assembly according to claim 10 wherein a horizontal member is disposed between said support members and said tray members are pivotally connected to said horizontal members.

13. The collapsible cart assembly according to claim 10 wherein said frame support includes a locking member and each said tray member includes a cooperating slide members and wherein when said assembly is moved from said first position to said second position said locking member and slide member cooperate to lock said assembly in said second position.

14. The collapsible cart assembly according to claim 11 wherein said vertical support members include a moveable carrier block member and said lazy-tong mechanism has one end thereof pivotally mounted to said carrier block.

15. The collapsible cart assembly according to claim 12 wherein there are a pair of horizontal members disposed between said support members with one being disposed at an upper level and the second disposed at an intermediate level.

16. The collapsible cart assembly according to claim 13 wherein said locking member sand said slide member have complimentary surface areas which matingly engage to lock said assembly in an open position.

17. The collapsible cart assembly according to claim 14 wherein said carrier block includes a spring member interposed between said block and said support member to urge said assembly to move from its open service position to its collapsed position.

18. The collapsible cart assembly according to claim 15 wherein there are a pair of tray members pivotally connected on each side of said horizontal members.

* * * * *